K. MORI.
WATER METER.
APPLICATION FILED JAN. 24, 1917.

1,384,329.

Patented July 12, 1921.
2 SHEETS—SHEET 1.

INVENTOR
Katsukichi Mori
BY
Wm Wallace White
ATTORNEY

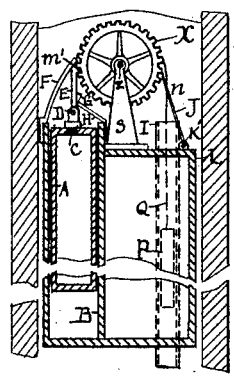
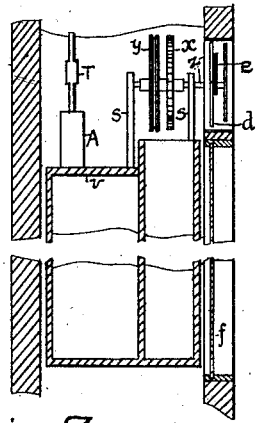
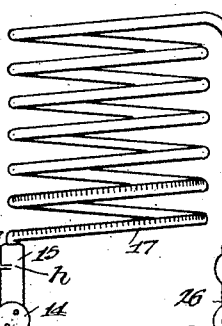
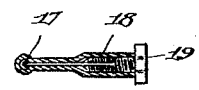
Fig. 6.  Fig. 7.  Fig. 9.
Fig. 8.
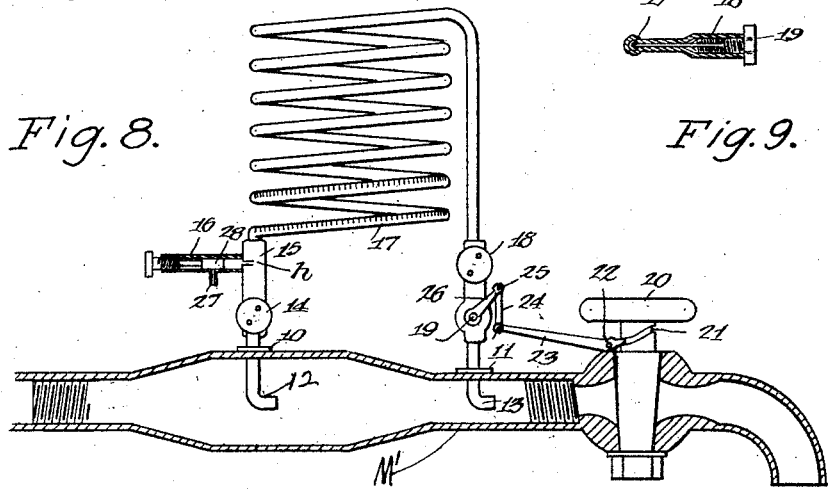
Fig. 10.  Fig. 12.
Fig. 11.
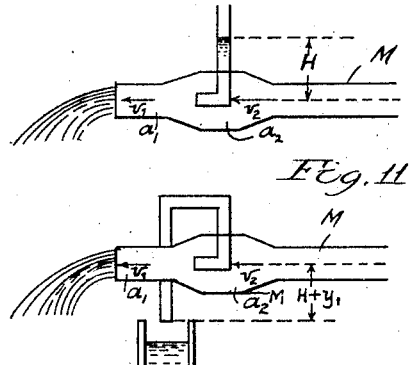
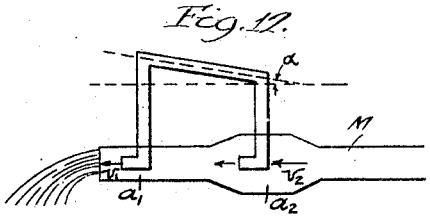

UNITED STATES PATENT OFFICE.

KATSUKICHI MORI, OF TOKYO, JAPAN.

WATER-METER.

1,384,329.  Specification of Letters Patent.  Patented July 12, 1921.

Application filed January 24, 1917. Serial No. 144,114.

*To all whom it may concern:*

Be it known that I, KATSUKICHI MORI, subject of the Emperor of Japan, residing at No. 19 Ginza Itchome, Kyobashi-ku, Tokyo, Japan, have invented new and useful Improvements in Water-Meters, of which the following is a specification.

This invention relates to a water meter consisting of one main pipe, which is to be connected to the outlet end of the water supply pipe, and has two different cross sectional areas, and one or two glass or metal tubes of small bore, one end of which is inserted into the above mentioned main pipe, while the other end is either left open or connected together, the water flow through the main pipe being calculated from the measurement of the flow through the branch tubes. The object of the invention lies in measuring the flow accurately at a very small construction cost. The meter is constructed in two forms as follows:—

*Form A water meter.*—In the meter of this form only one branch tube is employed, with one end of it inserted into that part of the main pipe where the sectional area is large, while the other end is left free, so that a portion of the water flowing through the main pipe is allowed to discharge from this free end, and by measurement of this discharge the flow through the main pipe is calculated.

*Form B water meter.*—In the meter of this form two branch tubes are employed, with one end of each tube respectively inserted into the main pipe at the points corresponding to the two different sectional areas, while the other ends are connected together with a small tube, and, by forcing an air bubble into the branch tubes and measuring the motion of this air bubble caused by the flow of water through the said branch tubes, the flow through the main pipe is calculated.

Referring to the drawings,—

Fig. 6 is an elevation of Fig. 5 as cut through by a plane E—E, principally showing the water box, the float arranged therein, and the device automatically indicating the motion of said float.

Fig. 7 is a side elevation of Fig. 5 as cut by a plane through O—O, and illustrates the arrangement of the water box, toothed wheel, grooved pulley, scale disk, and the needle pointer.

Fig. 8 shows a general view of Form B water meter.

Fig. 9 is a vertical section of the drain pipe.

Figs. 10, 11 and 12 are graphic illustrations of the principles of the water meters.

As illustrated in Figs. 10 and 11 in Form A water meter when a branch tube is inserted into the main pipe M, which has two different cross-sectional areas like $a_1$ and $a_2$ there is established a head of water in the branch tube corresponding to the difference in velocity heads as caused by the difference in the sectional area of the main pipe. When the main pipe is held in a fixed position, and the free end of the branch tube is gradually lowered, a portion of the water flowing through the main pipe will run into the said branch tube, and, if the outlet of the branch tube is held in the proper position, the ratio of flow through the main pipe to that through the branch tube may be determined.

As illustrated in Fig. 12, in Form B water meter, when two branch tubes are provided respectively at two points of the main pipe having two different sectional areas like $a_1$ and $a_2$, and the free ends of the tube are connected by another small tube, water will flow through the tubes due to the difference in head previously described. By forcing a fixed volume of air bubble into the branch tube, and by giving the branch pipe a proper inclination,—thereby producing a head in the branch tube on account of the rising tendency of the air bubble,—the water flow through the main pipe may be made in direct proportion to the movement of the air bubble in said tube.

In either form, A or B, it is required to make the opening of the branch tubes in the main pipe smaller than any other part of said tubes, since by so doing a more accurate measurement of the main flow can be attained than otherwise.

Furthermore, with Form A water meter, as well as with Form B, when equipped with a suitable water box, the water flow through the main pipe can be measured entirely without use of mechanical indicating means.

Figure 1:
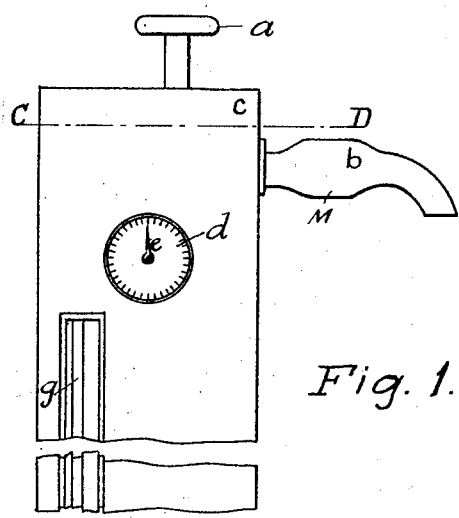
Figure 1 shows a hydrant equipped with Form A water meter.
Figure 4:
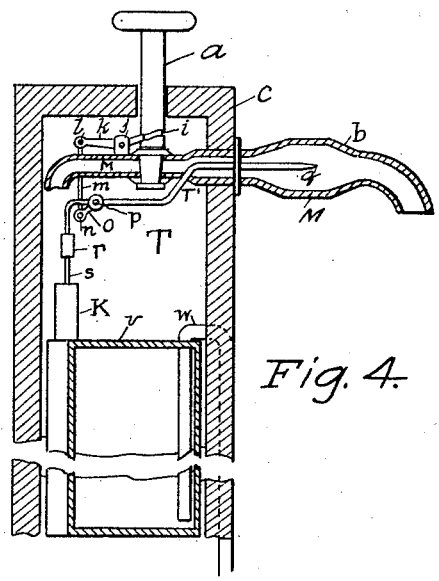
Fig. 4 is a front elevation of Fig. 3 as sectioned through plane A—B, showing mainly the arrangement of the branch tubes and the water box.
Figure 5:
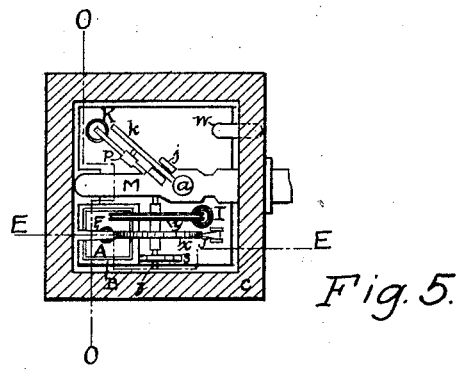
Fig. 5 is a plan view of Fig. 1 as cut by a plane C—D.

In regard to the construction of the meters,—In Form A water meter, as shown in Fig. 4, $a$ is a cock and $b$ the outlet of the main pipe $m$ which is connected with said cock and has two different sectional areas. In the cock $a$ is cut a cam slot $i$ into which engages one end of a lever $k$, which is pivoted at $j$ while the other end supports a spindle $l$. $m$, is a link connecting $l$ with $n$, another spindle, which connects $m$ with $o$, the arm of a cock $p$, such cock $p$ controlling a branch tube T. T has a small aperture at $q$, penetrates the main pipe $m$ at $T^1$, connects with a connecting tube $r$ through the cock $p$, and then joins with a tube $s$. The other end of tube $s$ is left open. $v$ is a small iron tank with a port to receive water flowing out from $s$. In one corner of the iron tank $v$ there is a chamber B (see Figs. 5 and 6). In chamber B is a float A constructed of iron, and the chamber B is connected with the tank $v$ at the lower part. On top of the float A is a plug C (Fig. 6), which has a pivot D supporting a rod E having projections $M^1$ and G. Above the tank $v$ (Figs. 5, 6, and 7) there are fixed a toothed wheel $x$ and a grooved pulley $y$, both of which are supported on a common shaft $z$, which in turn is carried by bearing pedestals S rigidly mounted on top of the water box. I (Figs. 5 and 6) is an empty cylinder completely separated from the tank, and therein hangs a plumb weight P which is suspended by a string Q, the other end of which is wound around the grooved pulley $y$. A pawl J is supported by a pivot $k^1$ fixed on top of the water box, and has its other end engaged with the toothed wheel at $n$, thus completely checking the right hand rotation of the wheel. The shaft $z$ extends through a recess portion of the casing $c$, and is provided with an indicating hand $e$ which moves in front of a scale disk $d$, as shown in Figs. 1 and 7.

Figure 2:
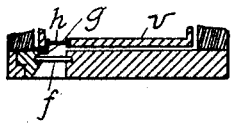
Fig. 2 is a horizontal section of the front plate showing the scale contained thereon and also the construction of the window having a glass plate inserted.
Figure 3:
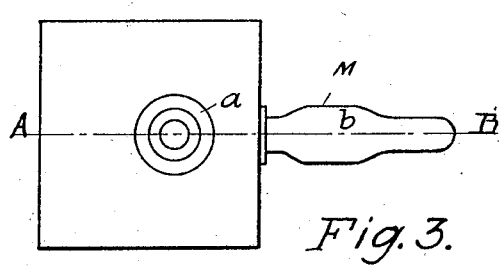
Fig. 3 is a plan view of Fig. 1.

The front wall of the chamber B in the tank $v$ and the front wall of the casing $c$ have portions cut out as illustrated in Fig. 2, and glass plates $h$ and $f$ are inserted therein, thereby preventing leakage of water from the water tank, and at the same time enabling observation from outside of the motion of the float contained in the chamber.

Now the operation of the meter is as follows:—

First referring to Fig. 4, when the cock $a$ is opened water commences to flow through the main pipe M toward $b$ and at the same instant, due to the action of the lever $k$, the cock $p$ is opened. A small quantity of water flows into the tank $v$ from the branch tube T at the same time as the water flows out from $b$. As the water level in $v$ gradually rises, the float A also rises, that is, the latter rises in proportion to the quantity of water discharged from $b$. Therefore the flow through the main pipe is calculated from the reading of the amount of water in the water tank by means of a reference line marked on the front face of the float and the scale illustrated in Figs. 1 and 2. When the water level in the water tank further rises and reaches its highest point, the rod E fixed on top of the float also rises, keeping in contact with an iron guide strip F, and finally causes the projection $m^1$ to engage with one of the teeth of the toothed wheel, at the same time emptying the water in the tank in a very short period of time through a siphon W which has one end opened inside the water tank and the other end opened in the atmosphere at some lower level. Thus the level in the water tank suddenly descends, and, due to the weight of the float, the toothed wheel turns to the extent of one tooth, at the same time disengaging the projection $m$ from the toothed wheel by the action of the other projection G and an iron guide piece H (Fig. 6). The toothed wheel tends to reverse rotation on account of the weight P, but it stops, being opposed by the rod J. The rotation of the toothed wheel is transmitted to the indicating hand $e$ (Fig. 7), and enables one to read the same on the scaled disk shown in Fig. 1. Thus, since the product of the number of times the tank has been filled and the capacity of said tank, plus the actual amount of water left in the tank, is the quantity of flow through the branch tube, the corresponding flow through the main pipe can be immediately calculated. The capacity of the tank and the number of teeth of the toothed-wheel may be made at will to suit individual requirements, and the highest position of the float, or the highest level of the water in the tank, may also be regulated by pouring some water into the float.

In the Form B water meter, as shown in Fig. 8, $m'$ is the main pipe with openings at two points 10 and 11, into which two glass or metallic tubes 12 and 13 are rigidly inserted. At the upper end of 12 is attached a valve 14 and connecting tube 15. On one side of 15 an air-bubble inlet pipe 16 is provided, and to the upper end of the connecting tube is joined a spiral-shaped glass tube 17, the other end of which is fitted on to the connecting tube 13. 18 is a drain pipe, and 19 a valve in the connecting tube 13 so arranged as to operate in conjunction with the operation of the cock 20 through link mechanism composed of a slot 21 cut in the spindle of the cock 20, and 22, 23, 24, 25, and 26.

The meter of this form operates in the following manner:—

When the water in the main pipe line is discharged by opening the cock 20, there is produced a head and consequently a small portion of the water gradually flows into the spiral tube 17 through the branch tube 12. When the branch tube 12 is completely filled with water, the closing of the cock stops the flow in the branch tube. Now open the drain pipe 18, and at the same time slowly force the air, previously admitted from 27 by means of a piston 28 in the air-bubble inlet pipe, into the spiral tube until a bubble of a suitable volume is obtained. Then close the drain pipe 18. When the cock 20 is reopened the air bubble will ascend at a rate corresponding to the water flow in the main pipe. The distance the air bubble travels may be measured by scale divisions on the spiral tube marked from a previous experiment, and thus the water flow in the main pipe line can be calculated.

The following is a mathematical demonstration that in the operation of the water meter the discharge through the main tube is directly proportional to the discharge through the branch tube. Reference is had to Figs. 10 to 12, inclusive, of the drawings.

According to the fundamental principle of hydraulics—

$$H = \frac{V_1^2 - V_2^2}{2g} - \frac{V_2^2}{2g}$$

$$= \frac{V_1^2 - 2V_2^2}{2g}$$

$$= \frac{V_1^2 \left\{ 1 - 2\left(\frac{A_1}{A_2}\right)^2 \right\}}{2g}$$

$$= V_1^2 \times C$$

in which $$C = \frac{\left\{ 1 - 2\left(\frac{A_1}{A_2}\right)^2 \right\}}{2g}$$

But $$Q = A_1 \times V_1 \therefore V_1 = \frac{Q}{A_1}$$

therefore $$H = V_1^2 \times C$$
$$= \left(\frac{Q}{A_1}\right)^2 \times C$$
$$= Q^2 \times \frac{C}{A_1^2}$$
$$= Q^2 \times C_1$$

in which $$C_1 = \frac{C}{A_1^2}$$

$$\therefore H = Q^2 \times C_1 \text{------------(I)}$$

Take coördinate axes and plotting the value of $q$ and H on abscissa and ordinate respectively. See the accompanying diagram. The locus showing the relation be-

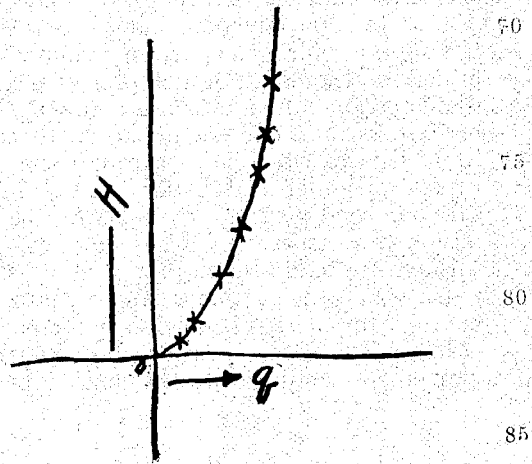

tween $q$ and H thus obtained is also a parabola which may be expressed $$H = q^2 \times C_2 \text{------------(II)}$$

in which $C_2$ is a certain constant and easily found by simple operation from the nature of the locus.

equation (I) $H = Q^2 \times C_1$
equation (II) $H = q^2 \times C_2$ is obtained independent each other.

Now if in the enlarged portion of a main, discharging a certain amount of water as in Fig. 10, a branch tube be inserted, both equations (I) and (II) must hold true at the same time.

Therefore by eliminating H from the 2 equations, we get $$Q^2 \times C_1 = q^2 \times C_2$$

$$\therefore Q^2 = q^2 \times \frac{C_2}{C_1}$$

$$Q = q \times \sqrt{\frac{C_2}{C_1}}$$

$$= q \times K$$

where $$K = \sqrt{\frac{C_2}{C_1}} = \text{constant.}$$

When it is desired to move the air-bubble in the branch tube either forward or backward, the movement can easily be effected by manipulating the air-bubble inlet pipe 16, valve 14, discharge pipe 18 and valve 19.

Claims.

1. A method of discharging a constant proportionate quantity of fluid from a pipe which consists in creating back pressure of the fluid in the pipe and then discharging a portion of the fluid from the pipe at the point at which the back pressure is created.

2. A fluid meter comprising a main pipe having an enlarged section, and a branch pipe communicating with the main pipe at the enlarged section, the inlet end of the said branch pipe facing in the direction in which the fluid flows through the main pipe.

3. A fluid meter comprising a main pipe having an enlarged portion remote from either end thereof, a branch pipe of uniform diameter extending into the main pipe and having its inlet end facing in the direction in which the fluid flows through the main pipe, said inlet end being located in the said enlarged portion of the main pipe, and means for measuring the flow of fluid through the said branch pipe.

4. A fluid meter comprising a main pipe having an enlarged portion remote from either end thereof, a branch pipe of uniform diameter extending into the main pipe and having an inlet end facing in the direction in which the fluid flows through the main pipe, said inlet end being located in the said enlarged portion of the main pipe, and the said branch pipe having its outlet end extending into the main pipe between the enlarged portion and the outlet end of the main pipe, the outlet end of the branch pipe facing in the direction in which the fluid flows, and means for measuring the flow of fluid through the said branch pipe.

In testimony whereof I have signed my name to this specification in the presence of two subscribing witnesses.

KATSUKICHI MORI.

Witnesses:
SHUNKICHI KIMURA,
A. F. CAHUSAC.